United States Patent [19]

Thompson

[11] Patent Number: 5,005,187

[45] Date of Patent: Apr. 2, 1991

[54] REMOTE CONTROL

[75] Inventor: David R. Thompson, Fife, Great Britain

[73] Assignee: Pico Electronics Limited, Glenrothes, Scotland

[21] Appl. No.: 327,975

[22] Filed: Mar. 23, 1989

[30] Foreign Application Priority Data

Mar. 25, 1988 [GB] United Kingdom ............... 8807193

[51] Int. Cl.$^5$ ........................................ H04L 27/06
[52] U.S. Cl. ................................ 375/94; 340/310 R; 328/173
[58] Field of Search .................. 375/78, 88, 92, 94, 375/93; 340/310 R, 310 A; 329/300, 311; 328/173; 379/66

[56] References Cited

U.S. PATENT DOCUMENTS

| | | | |
|---|---|---|---|
| 2,901,541 | 8/1959 | Kenyon | 375/92 |
| 3,376,514 | 4/1968 | Womack et al. | 375/94 |
| 4,392,233 | 7/1983 | Laughner | 375/93 |
| 4,627,078 | 12/1986 | Stoner | 375/88 |
| 4,636,771 | 1/1987 | Ochs | 340/310 A |
| 4,675,579 | 6/1987 | Hardy et al. | 340/310 R |
| 4,746,897 | 5/1988 | Shuey | 340/310 R |

FOREIGN PATENT DOCUMENTS

| | | |
|---|---|---|
| 0088830 | 9/1983 | European Pat. Off. |
| 0106924 | 5/1984 | European Pat. Off. |
| 0130164 | 1/1985 | European Pat. Off. |
| 869407 | 5/1961 | United Kingdom |
| 974460 | 11/1964 | United Kingdom |

Primary Examiner—Benedict V. Safourek
Assistant Examiner—Stephen Chin
Attorney, Agent, or Firm—Pravel, Gambrell, Hewitt, Kimball & Krieger

[57] ABSTRACT

In the field of powerline carrier transmission and reception for remote control, a slave receiver counts cycles of carrier in a time window near to a zero-crossing of the power main. The receiver is implemented using discrete components (1,2,3) and a microprocessor. The discrete components form an input filter (1), a limiting preamplifier (2), a demodulator and noise filter (3) and, along with the microprocessor, a system (4) to detect the zero-crossing points. A capacitor is charged and discharged, depending upon the rate of occurrence of carrier cycles to produce a binary signal dependent on the digital value present on the carrier. By measuring the length of time the binary signal is in one of its states in said time window, the microprocessor determines whether the signal resulted from noise or not.

11 Claims, 6 Drawing Sheets

REMOTE CONTROL

BACKGROUND OF THE INVENTION

In the field of powerline carrier transmission and reception, the technique of counting cycles of carrier in a time slot or window near to a zero-crossing of the power main in order to determine the bit value of a serial digital message transmitted on a R. F. Carrier superimposed on the main is known and described in British Patent No. 1592971. The ability of this technique to allow such a communications system to work in the presence of continuous noise of frequency below that of the carrier, or in the presence of discontinuous noise which cannot accumulate sufficient cycles within the window to register a bit '1' value, is an important factor in an effective implementation of remote control systems utilising power line carrier methods. Using the carrier counting technique allows a cheap and relatively broadband front end filter to be used.

In a practical implementation using a carrier frequency of 120Khz, the counting technique and bit decoding can be carried out in a custom integrated circuit and the front end filter can be a single tuned IF transformer centred on 120Khz and giving a 3dB bandwidth of approximately 10 Khz. A window can be selected of, say, 600 microseconds and 64 cycles transmitted in the window to designate a bit value of '1' and zero cycles to designate a bit valve of '0'.

The counting technique within the circuit is able to reject continuous noise below 80 Khz and also discontinuous noise at 120 Khz provided that, in the latter case, the accumulated number of cycles within the 600 microsecond receive window is less than 48. The first type of noise might be generated by televisions, switch-mode power supplies or commutator noise from motors, whilst the second type of noise might be generated by triac switching in a lamp dimmer or as a result of an appliance switching on or off.

This second type of noise is characteristically a series of impulses which cause any filters on the main to ring at their resonant frequency, in this case 120 Khz. The signal is, however, discontinuous and appears as a repetitive burst of rings. The length of each burst depends upon the damping coefficient of the filter, but is assumed to be shorter than the period between impulses. Although the combination of carrier counting contained within a custom integrated circuit together with the simple front end filter is a cost effective and successful approach to power line carrier remote control, it makes sense only so long as the supply of custom chips is secure and reasonably priced. For commercial reasons, an alternative way of achieving the noise rejection characteristics described above would be desirable using commercially available components such as microprocessors.

Although there are a number of cost effective single chip microprocessors available today which could be programmed to decode messages in the format required and provide a receiver module function, none of these contain an input counter which can count in real time the number of cycles of carrier present in a narrow window near to the mains zero-crossing. To implement this function externally using standard digital counting I.C.'s would not be cost effective.

SUMMARY OF THE INVENTION

According to one aspect of the present invention, there is provided a slave receiver for detecting commands in the form of digital signals modulated on a cyclic carrier, the receiver comprising means responsive to the carrier to determine the digital values of the digital signals in dependence upon the number of cycles of carriers within time windows defined by the receiver, characterised in that the responsive means comprises an input circuit having an output stage switchable between two states to and produce a binary signal and capacitive means having charging and discharging circuit means
so responsive to said carrier that:

(a) the output stage has a first state when said carrier is absent;

(b) when the carrier has been present above a given frequency and for a first given time sufficient charge accumulates on the capacitive means to change the output stage to its second state;

(c) a subsequent break in the carrier of a length greater than a second given time (substantially less than the first time) causes a change of charge on the capacitive means to change the output stage to its first state;

(d) when said carrier is subsequently restored, then the output will remain in the first state for a time directly related to the length of said break before sufficient charge again accumulates to change the state to said second state; and (e) a cyclic signal of a frequency substantially below the given frequency cannot cause sufficient charge to accumulate to cause said output stage to attain its second state, the receiver further comprising means for processing the binary signal within said time windows to determine the binary values therefrom, It will be seen that a digital counter as used in UK Specification No. 1592971 can be avoided by the use of capacitive means to accumulate charge dependent upon the number and frequency of carrier cycles. More specifically, the resulting binary signal is suitable for processing by a microprocessor, e.g. by measuring the time for which the binary signal is in its second state in a window to determine the digital values, yet still discriminate against noise. Thus such a receiver can be constructed from a microprocessor and simple discrete analogue circuit elements.

Capacitive means for detecting a required number of cycles of a signal in a remote control system is known from UK Specification No. 1592971. In that case the output stage is a listable circuit switched to its second state when a first frequency is detected by a tuned circuit supplying the capacitive means. It can only be switched back to its second state by a signal of a second frequency detected by a second tuned circuit supplying a second capacitive means. A relay, for example, is switched by the bistable circuit. If noise exists sufficient to be detected as the first frequency, the bistable circuit switches and stays in its second state even if, as is characteristic of noise, the noise signal then terminates or becomes generally discontinuous.

A preferred embodiment has an input circuit comprising: an input to receive said signal; a current flow path comprising a sequential arrangement of two diodes with the same conducting direction; a first capacitance coupling the input to the junction between said diodes; a second capacitance connected across said diodes; and output switching means having its control input connected across the second capacitance, so that the state of the switching means is dependent upon the charge on the second capacitance.

Such a circuit can be implemented without resort to digital counting integrated circuits and it needs only a few cheap electronic components and a transistor for its implementation. A preferred embodiment is designed to take in a 120 Khz signal from the front end filter and provide a D.C. output if the signal is of sufficiently high frequency and is continuously present for a sufficient time. This signal is then suitable to feed into any microprocessor for further decoding. The microprocessor need only check that this output is present for sufficient time during the receive window to determine the bit value received and need not count cycles of carrier. This allows a number of cheap single chip microprocessors to be capable of being programmed to achieve a receiver function as described in British Patent No. 1592971.

According to a second aspect of the invention, there is provided a slave receiver for coupling to a power main to receive digital signals therefrom conveyed by a carrier modulated on the power main, the digital values of received signals being dependent upon the number of cycles of carrier within windows synchronised with the zero-crossings of the power main, the receiver having a demodulator comprising input means for coupling to a power main to extract therefrom a carrier signal of given frequency, and limiting means to limit the amplitude of the extracted signal, characterized by a capacitive arrangement arranged to be charged and discharged in dependence upon the presence and absence of cycles of the extracted signal and output means arranged to adopt one or other of two states depending upon the level of charge on the capacitive arrangement, the demodulator being such that the output means is in a first state in the absence of any extracted signal and adopts and maintains the second state in the presence of a substantially continuous extracted signal (at said given frequency) for at least a given time, adopting the first state again when gaps in the cycles of the extracted signal exist for more than a given time or if the frequency of the extracted signal is below a second frequency less than the given frequency, thereby to demodulate said carrier signal whilst discriminating against noise signals on the power main.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
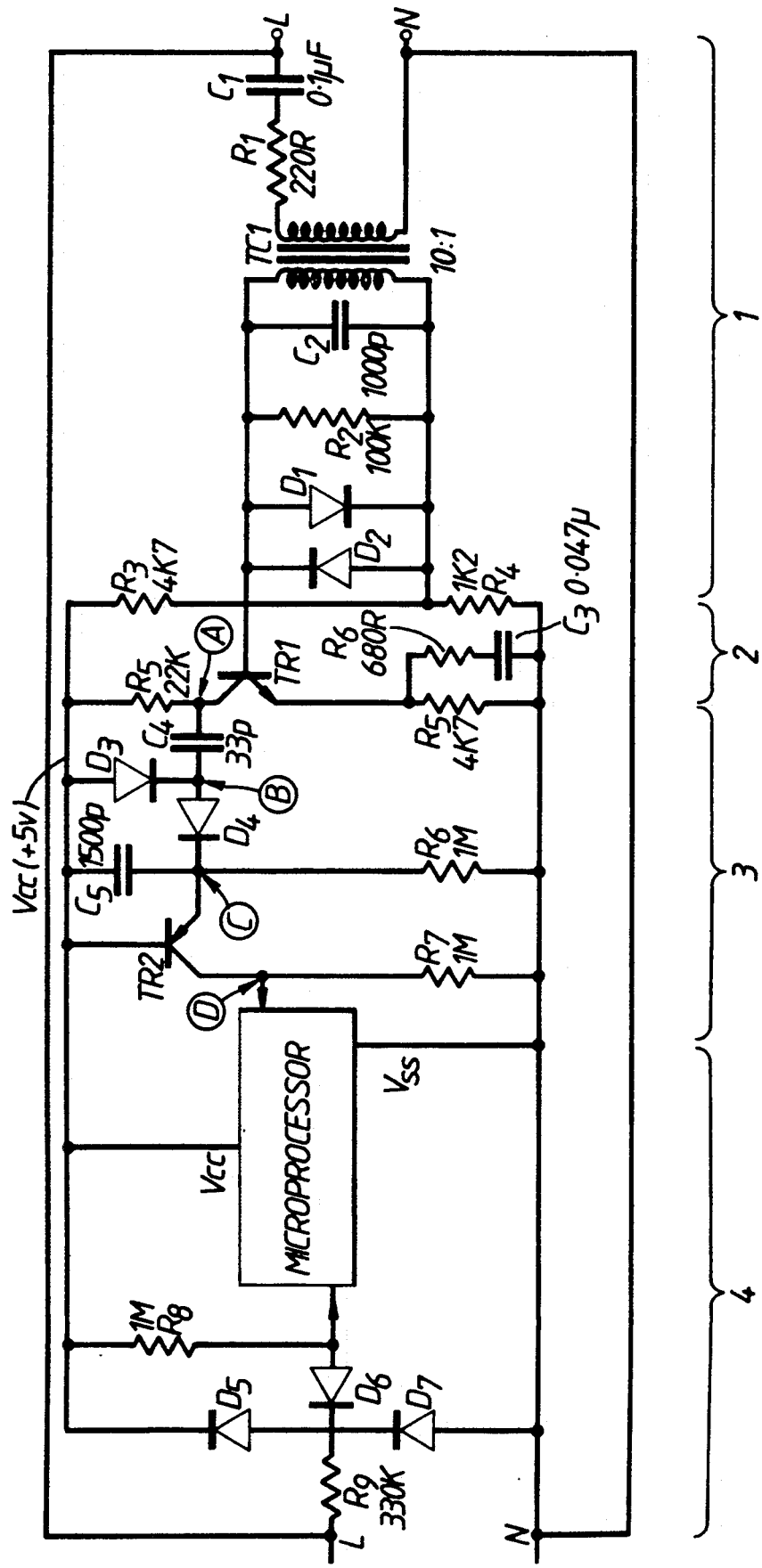
FIG. 1 is a diagram of a slave receiver circuit.

A slave receiver circuit is shown in FIG. 1 and comprises four parts, an input filter 1, limiting preamplifier 2, demodulator and noise filter 3 and a microprocessor system 4 designed to implement the functions set out in British Patent No. 1592971 the content of which is therefore hereby imported into the present specification. The skilled man will readily be able to ascertain from UK No. 1592971 the logical functions, steps and sequences carried out by the slave receiver described therein. From that information, he will readily be able to program the microprocessor to carry out those functions, steps and sequences, with the exception of the cycle counting and zero-crossing detection which are now to be described. The demodulator 3 is the section of particular interest, although the other sections are described also for a more complete understanding of the operation of the demodulator. The input filter 2 is the same as that applicable to the receiver modules according to British Patent No. 1592971 which, suitably, use a custom IC containing an input counter. The input filter 1 comprises input resistor $R_1$ and capacitor $C_1$, a transformer TC1 of 10:1 ratio, tuned circuit components $R_2$ and $C_2$ and protecting diodes $D_1$ and $D_2$. With the values shown, the filter can transform a 120 Khz signal on the power main of 35mV peak-to-peak into a 200mV peak-to-peak suitable for inputting directly to a custom IC. Receiver modules with this input filter and a custom IC operate best when their sensitivity to signals on the main is between 20 and 50 millivolts. If receivers are set to accept signals below 20mV, then too much background noise can get through and jam reception. If receivers cannot accept signals of less than 50mV, then reception can be spoiled by poor signal strength. In the succeeding discussion it has been taken as a design aim that the minimum signal that the system would have to accept would also be 35mV on the power main, or 200mV peak to peak at the output of the input filter 1.

Diodes D1, D2 are fitted specifically to limit the amplitude of noise spikes at the output of the filter. On the power main, noise may be present at varying levels from tens of volts to hundreds of volts, in the case of switching transients.

The diodes limit the amplitude at the filter output to approximately 1.2V peak-to-peak. $R_2$ is then chosen in value to increase the damping coefficient so that the succeeding rings of the filter as a result of a noise spike do not amount to more than 15 cycles before their amplitude has decayed below the 200mV peak-to-peak level. Typically the ringing caused by a lamp dimming triac switch may be nearer to 10 cycles.

The output of the filter is fed into a preamplifier 2 composed of transistor TR1, resistors $R_3$ to $R_6$ and capacitor $C_3$. It has a gain of 20 and boosts the 200mV signal from the input filter into a 4V signal at the collector of TR1. The values given are for operation on a 5V power supply, so a 4V peak-to-peak signal is the maximum signal that the pre-amplifier can generate. This means that signals on the main, or noise, which are bigger than 35mV do not give any more signal out of the pre-amplifier than does a 35mV signal.

The demodulator 3 consists of capacitors $C_4$ and $C_5$, diodes $D_3$, $D_4$, resistors $R_6$, $R_7$ and transistor TR2, and performs the following functions:

a) Only when carrier has been present for a predetermined time does it output a high level.

b) To maintain the output, carrier must continue to be present—any short breaks of more than a few cycles cause the output to go low. When carrier is restored after a break it must again be present for a time before the output again goes high. The amount of time taken to get the output back high is substantially proportional to the length of the break, up to a maximum value.

c) Signals significantly below that of the carrier frequency cannot cause the output to high—even when they may be at a 4V peak-to-peak level at the collector of TR1.

d) The output level of the demodulator is directly proportional to the input peak-to-peak level, provided that the preceding criteria are satisfied.

Figure 2A:
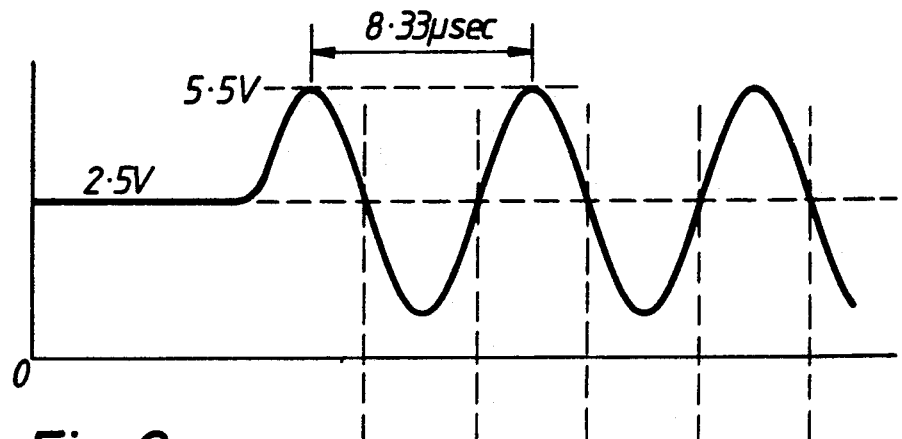
FIGS. 2a to 2c are waveforms at points A, B and C within the circuit of FIG. 1.
Figure 2B:
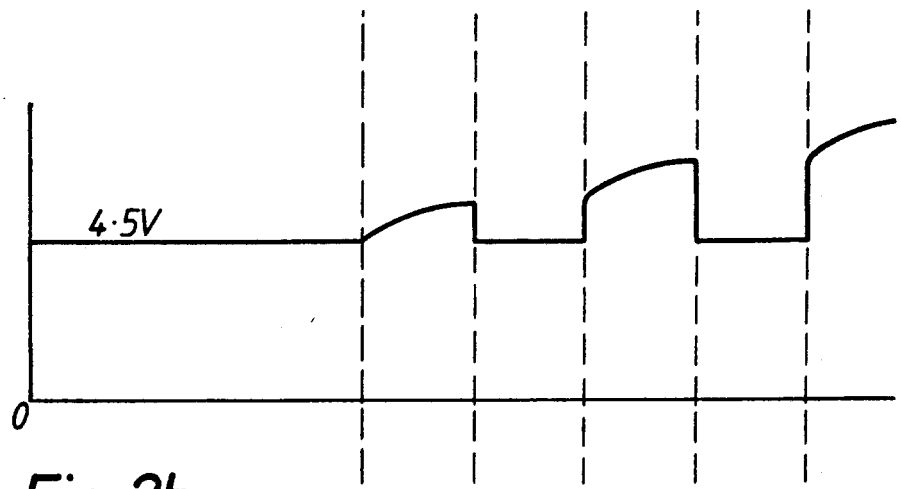
Figure 2C:
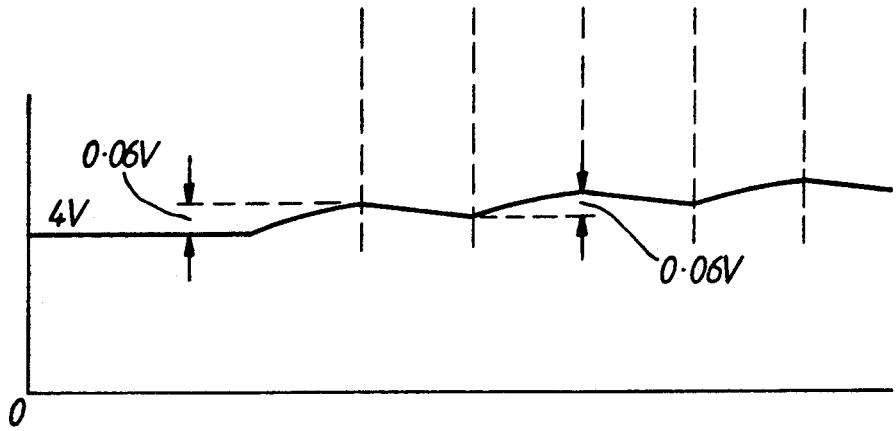
Figure 3A:
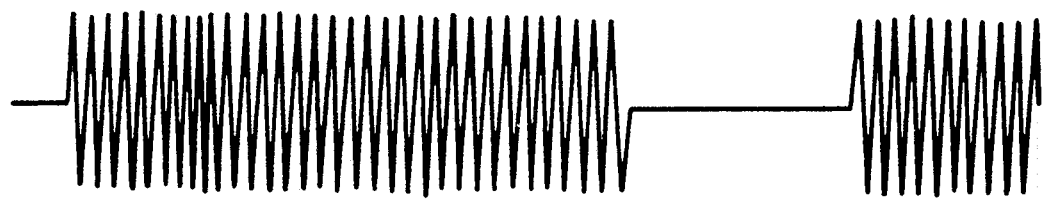
FIGS. 3a to 3d are waveforms to a smaller scale at points A to D within the circuit of FIG. 1.
Figure 3B:
Figure 3C:
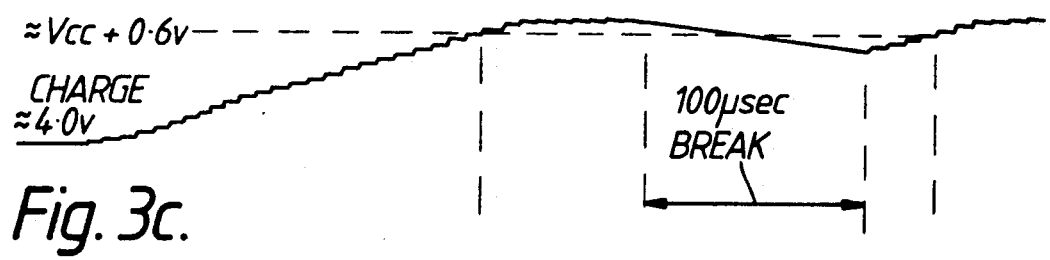
Figure 3D:
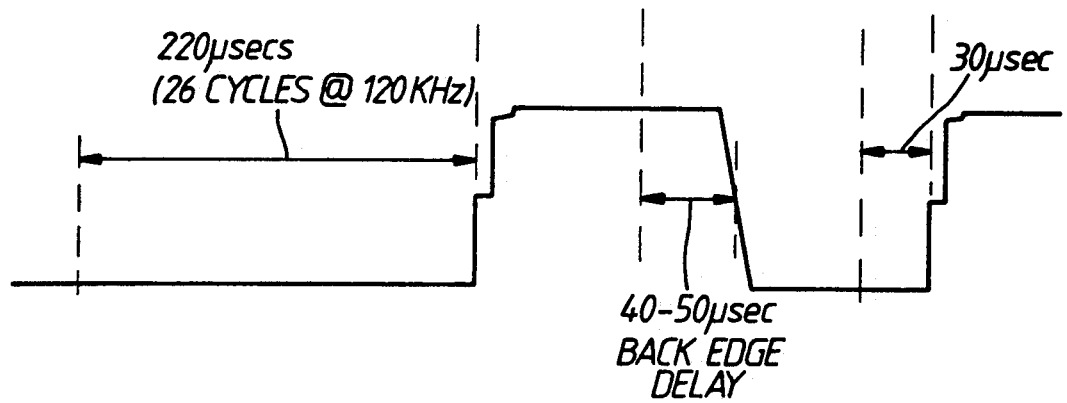

To understand how these functions are achieved, components $D_3$, $D_4$ and $C_4$ can be considered as a voltage doubler, used to dump charge onto $C_5$ instead of doubling the voltage at C. To assist in understanding the operation, the waveforms at points A, B and C are shown in FIG. 2a to 2c and, to a smaller scale, in FIGS. 3a to 3c. FIG. 3d shows the signal at point D. With no signal input, point A is about 2.5V, point B is one diode drop below $V_{cc}$ (i.e. at about 4.5V) and point C is at two diode drops below VCC i.e. approximately 4V. The base-emitter junction of TR2 is reverse biased, so TR2 is off and output level D is at ground. The collector of TR1 is biased somewhere near to VCC/2 at rest, but when a signal is present negative excursions cause $D_3$ to charge $C_4$ and maintain B at 4.5V.

When the collector of TR1 makes a positive excursion, the charge accumulated upon $C_4$ is dumped into $C_5$ via $D_4$ causing the voltage level at C to rise. Assuming that the voltage rise on $C_5$ is small, then B will return almost to its previous level and the amount of charge transferred will be approximately $C_4 \cdot Vp$, where Vp is the peak-to-peak voltage swing at the collector of TR1. When the voltage on the collector of TR1 falls below 2.5V again at the beginning of the next signal cycle, the same process will repeat, and if it is assumed that the voltage change on $C_5$ is small compared with Vp, then the charge transferred to $C_5$ per cycle is almost constant and would cause the voltage at C to rise by:

$$\frac{C_4 \cdot Vp}{C_5} \text{ each cycle}$$

However, once the voltage $V_c$ at C rises above its quiescent point, diodes $D_3$ and $D_4$ begin to cut-off and so cannot supply current through $R_6$. $R_6$ now begins to discharge $C_5$ and therefore during one cycle will remove an amount of charge $$\frac{V_c}{R_6} \times \frac{1}{f}$$

where f is the frequency of the signal.

Consequently the net charge on $C_5$ is increased by $$C_4 \cdot Vp - \frac{V_c}{R_6 \cdot f} \text{ per cycle}$$

hence the voltage on $C_5$ will increase by $$\frac{1}{C_5} \times \left( C_4 \cdot Vp - \frac{V_c}{R_6 \cdot f} \right) \text{per cycle} \quad \text{Eqn 1}$$

It is possible to assess the validity of the assumption that the voltage at C does not change much compared with the peak-to-peak signal voltage Vp. At rest, the value of $V_c$ is approximately 4 volts (2 diode drops below VCC). When signal has been present for sufficient time then eventually $V_c$ will rise to VCC, plus the base-emitter threshold of TR2, at which point common base transistor TR2 will turn on and any excess current passes into the emmiter of TR2. Thus $V_c$ can never vary from below 4V to more than 5.6 volts, a change of 1.6V. Since the main interest is the response to signals on the main of 35mV or more (3.5 to 4V peak-to-peak at A) then to a first approximation it is valid to assume any change in $V_c$ is small compared with Vp. In any case the effect of $V_c$ increasing with time after a signal is present is that the charge transferred per cycle would decrease slightly and make any rise time at $V_c$ slightly longer than these calculations show. We can also assume that the current drain through $R_6$ is constant and equal to $V_c/R_6$ (average) whilst a signal is present. With the values given in FIG. 1, $V_c$ (average) could be assumed to be 5V giving a current through $R_6$ of 5 microamps. Thus eqn. 1 simplifies to $$\frac{1}{C_5} \times \left( C_4 \cdot Vp - \frac{5 \times 10^{-6}}{f} \right) \text{per cycle}$$

Since $C_5$ has to be charged through 1.6V before the base-emitter junction of TR2 can be forward biased and current passed to the output D to produce an output voltage, then the number of cycles of signal needed to achieve this will be $$N = \frac{1.6}{\text{Increase in } V_c \text{ per cycle}} = \frac{1.6 \, C_5}{C_4 \cdot Vp - \frac{5 \times 10^{-6}}{f}}$$

and therefore the time to achieve this will be $$T = \frac{N}{f} = \frac{1.6 \, C_5}{f \cdot C_4 \cdot Vp - 5 \times 10^{-6}} \quad \text{Eqn 2}$$

Put simply, Eqn 2 states:

Time to charge $C_5$ through 1.6 V =

$$\frac{1.6 \times C_5}{\text{(Charging Current through } C_4\text{)} - \text{(discharge current)}}$$
(through $R_6$)

What Eqn 2 immediately shows is that for any value of discharge current through $R_6$, the delay time of the demodulator for which carrier has to be present to generate an output is controlled by the ratio of $C_5$ to $C_4$. In the circuit shown, this time calculates to be 220 microseconds for a 120 Khz signal producing a 4V signal at the collector TR1, thereby achieving the first objective of the circuit.

Once $V_c$ has reached VCC+0.6V, TR2 becomes fully turned on and any extra charging current goes as collector current through TR2 to maintain a voltage across $R_7$. Once $V_d$ has reached VCC, if the signal through the demodulator is of high enough frequency or amplitude to generate more charging current than can be passed through $R_6$ and $R_7$, then TR2 saturates and the additional current passes as increased base current. In other words, TR2 limits $V_c$ to be between 0.6 and 0.7 volts above VCC. Once signal stops, then $R_6$ discharges $C_5$ until, ultimately, $V_c$ reaches approximately 1V below VCC and diodes $D_3$ and $D_4$ again begin to conduct. The rate at which $R_6$ discharges $C_5$ is almost linear, since the voltage change at $V_c$ is small compared with $V_c$. Once signal stops, the rate at which $V_c$ is given by $$\frac{\text{Discharge current through } R_6}{C_5} \text{ V/sec.}$$

With the values given in FIG. 1, $V_c$ decreases by 0.3 volts every 100 microseconds. Since, typically, $V_c$ only needs to drop from its maximum of VCC+0.7 to VCC+0.55 before TR2 turns off, a signal break of approximately 50 microseconds will result in the output voltage at D falling to zero. Thereafter, as the signal break continues, $V_c$ falls further at 0.3V every 100 microseconds. It is apparent from Eqn 2 that, once signal returns, the amount of time taken to recharge $C_5$ up to VCC+0.6V is directly proportional to the amount that $V_c$ had dropped during the break. Thus, short breaks in signal of more than 50 microseconds cause the output of the demodulator to fall to zero and thereafter the amount of time taken to restore the output once signal returns is directly proportional to the length of the break, satisfying the second objective.

To understand how the third objective is achieved, it is apparent from Eqn 2 that the lower the frequency of the signal the longer will be time taken to generate an output at D, until, ultimately, for low enough frequencies no output would be generated at all. This can be understood more clearly by regarding $C_4$ as a source of charging current for $C_5$. To a first approximation the amount of current passed through $C_4$ is $$i = C_4 \cdot f \cdot Vp$$

where Vp is the peak-to-peak signal A at collector TR1. In order to maintain an output at D, this current must be sufficiently large to maintain $V_c$ at VCC+0.6V and the output $V_d$ at D near to VCC. If we assume that the microprocessor port which point D will drive has a logic threshold of VCC/2, then the minimum amount of current that $C_4$ must generate is $$\frac{VCC + 0.6}{R_6} + \frac{Vd}{R_7} = C_4 \cdot f \cdot Vp(\text{from above}) \qquad \text{Eqn 3}$$

Therefore with the values shown in FIG. 1

$$C_4 \cdot f \cdot Vp = 2.5 \ A + 5.6 \ A$$

Thus, for a 4V signal at the collector of TR1, the frequency must be at least $$f = \frac{8.1 \times 10^{-6}}{33 \times 10^{-12} \times 4} = 61.3 \text{ Khz}$$

otherwise the output at D will not be maintained.

In practice the minimum cutoff frequency was found to be nearer 70 Khz, probably due to voltage losses across $D_4$, $D_3$. Clearly, changing $R_6$, $R_7$ can modify the lower cutoff frequency to suit the application.

Finally to show that the output at D be proportional to the signal amplitude peak-to-peak at A when TR2 is on we can see from Eqn 3 that $$V_d = \left( C_4 f V_p - \frac{VCC + 0.6}{R_6} \right) R_7$$

which, for the values shown, becomes (at 120 Khz)

$$Vd = 3.96 \times Vp - 5.6$$

For a 35mV signal generating a Vp of 4V, $V_d$ would be 10V. Clearly this suggests that $C_4$ is then generating more current than is needed to hold $V_d$ at 5V and $V_c$ at 5.6V and the extra current is in fact absorbed by the base of TR2 as it saturates. However, for a 20mV signal generating 2.28 volts Vp, $$V_c = 3.4V,$$

close to the region where the microprocessor will not read it as a logic '1'. In this region the constant term in the above equation for $V_d$ dominates and further small decreases in signal rapidly cause $V_d$ to fall to zero.

Figure 4:
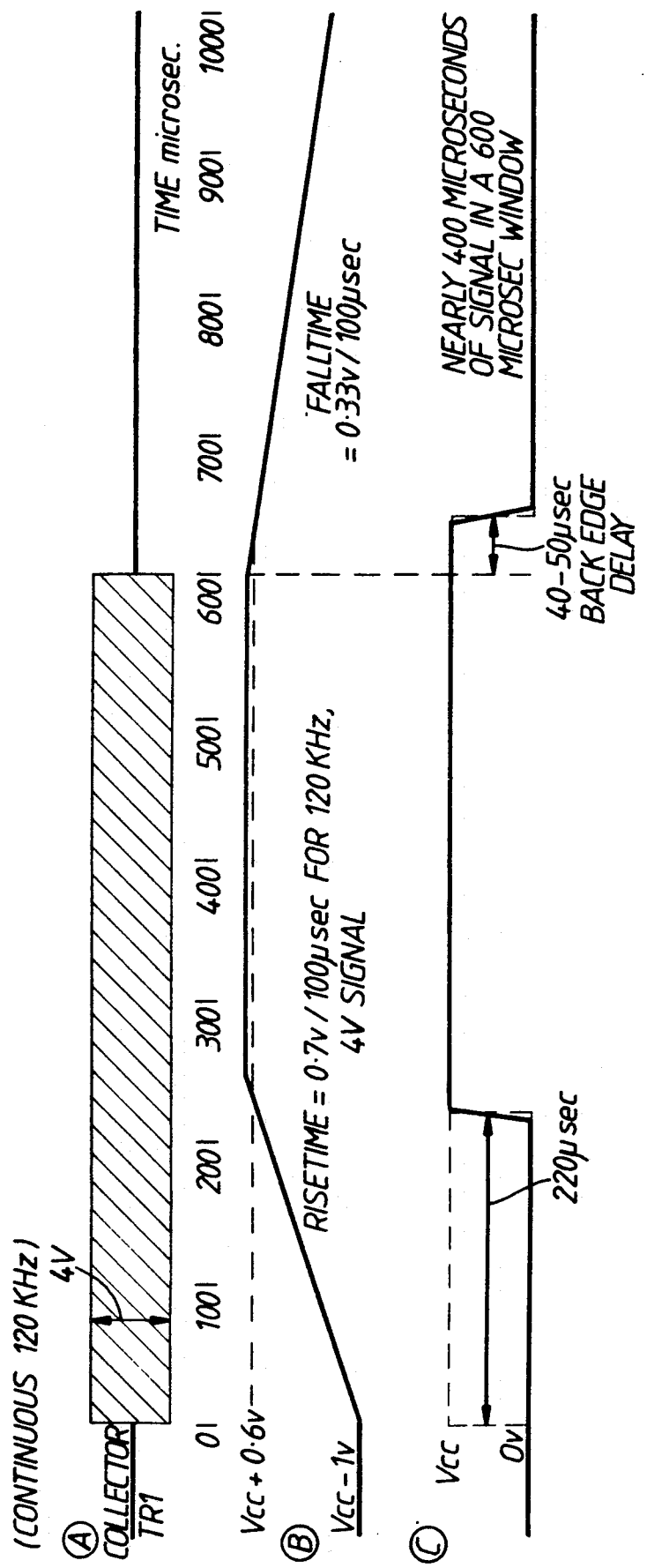
FIGS. 4 to 6 show waveforms at points A, C and D of FIG. 1 for three distinct conditions of the power main.
Figure 5:
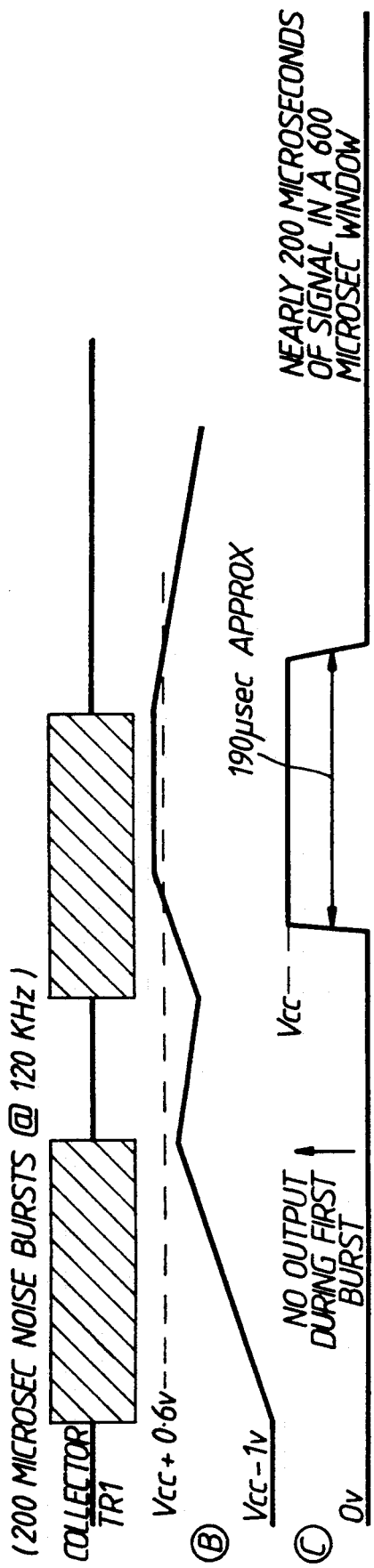
Figure 6:
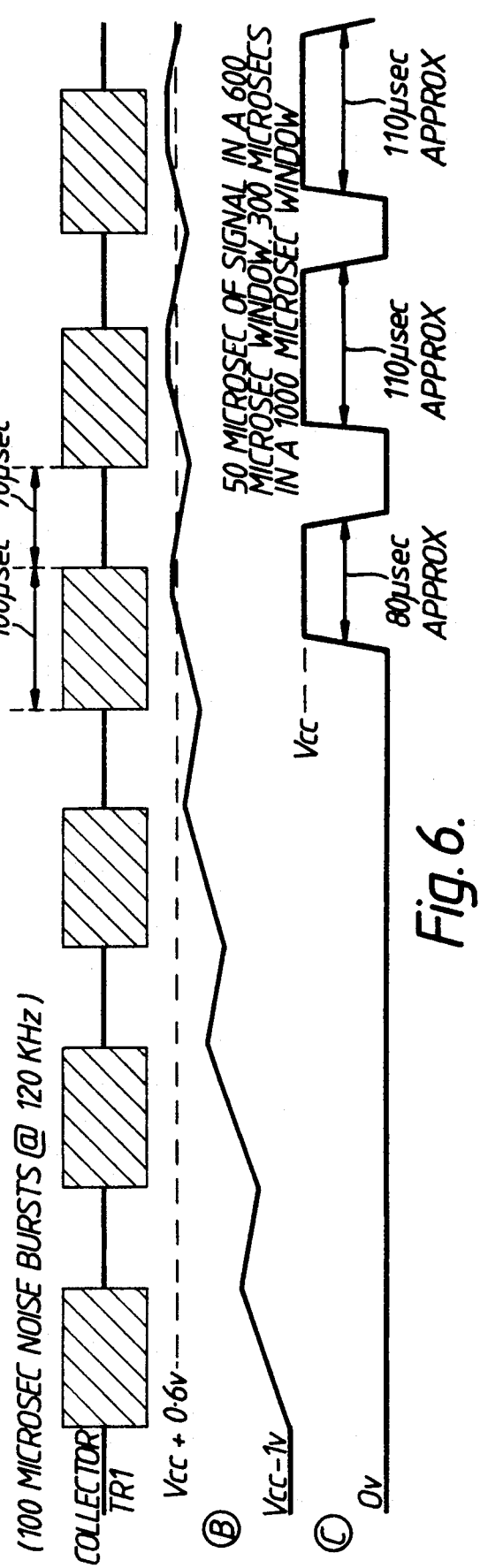

The operation of the slave receiver as a whole will now be summarised with reference to FIGS. 4, 5 and 6 relating to three district situations and each of which shows the waveforms at A, C and D.

The input filter 1 contains a diode limiter to absorb the energy of noise spikes and limit the amplitude of large signals on the main. It is also damped so that the number of cycles of ringing caused by a large noise spike will not exceed 10 to 15 cycles measured at the threshold amplitude. The gain of the pre-amplifier 2 is set to take a signal at the minimum amplitude the system has to recognise and boost it to a point close to the saturation point of the amplifier. This ensures that larger signals and noise at larger amplitudes are not given greater weight amplitude wise—a similar technique to that used in F.M. demodulation.

The demodulator 3 does not output a high level until signal has been present continuously for a predetermined number of cycles. For a 120 Khz signal this is approximately 26 cycles (or 220 μsecs), whereas for 70 Khz it is 40 cycles (approx. 570 μsecs). This is an effective discriminator against noise, which tends not to be continuous and is similar to the effect of the carrier counting techniques of the above mention patent where a signal has to generate 48 pulses in a window to generate a logic '1'. Here the window is determined by the decoding microprocessor and can be the same as the previous window, e.g. 600 μsecs. Also the ratio of $C_5$ to $C_4$ determines how many pulses are required to generate an output. In this example, 26 was chosen as being sufficient, but this figure can be changed at will.

The demodulator 3 does not allow through signals of frequency below a certain value (and lower than the carrier frequency of interest). This frequency cut-off value is determined by $C_4$ and the values of $R_6$ and $R_7$. In the example given, the cut-off frequency is around 70Khz, but could easily be made higher if deemed necessary. It achieves the same effect as a digital counting technique which requires 48 pulses in a 600 microsecond window to record a bit '1' value, equivalent to a 80 Khz noise signal (which could still pass through the input filter). In the present embodiment the effect is produced by performing a frequency to voltage conversion on the signal, as described earlier, and setting a threshold below which no voltage is output. This technique is not window width dependent, as it is with the digital counting technique, and allows the window width chosen for the microprocessor to be independent of cutoff frequency.

The output of the demodulator 3 will fall to zero after a signal break of 50 microseconds. Thereafter, when the signal returns, it must be continuously present for an amount of time before the demodulator will again output. This restart time is directly proportional to the length of the break, up to a maximum restart delay of 200-250 microseconds. In practice this means that a discontinuous signal, such as is common with noise, is further discriminated against. For instance, consider FIG. 5 in which a noise signal results in a 200 $\mu$sec burst of 120 Khz at 4V peak-to-peak at collector TR1 followed by a 100 $\mu$sec gap followed by another 200 $\mu$sec burst, occurring in a 600 microsecond window. This is sufficient signal to register a bit '1' value by the digital counting technique. Using the demodulator 3 it would result in a high output lasting approximately 190 microseconds (the first burst results in no output, thereafter the 100 $\mu$sec gap causes an extra 50 microseconds delay in the second 200 microsecond burst). In the latter case a signal which lasted a cumulative total of 400 microseconds has been reduced to one lasting a total of 190 microseconds in the 600 microsecond window.

With this noise reduction to less than 50 percent it is easy to program the microprocessor to distinguish between that noise pattern and a true signal, which would be present for nearly 400 microseconds (FIG. 4). Similarly a waveform of 100 microsecond bursts (12 cycles of ringing of 120 Khz) occurring every 170 microseconds (FIG. 6), as might be expected from closely spaced triac firing pulses, would barely produce 50 microseconds of signal in a 600 microsecond window and only 290 microseconds of signal in a 1 millisecond window. Again a noise reduction to less than 50 percent has been achieved on a signal which would have been detected by the digital counting system.

Figure 7:
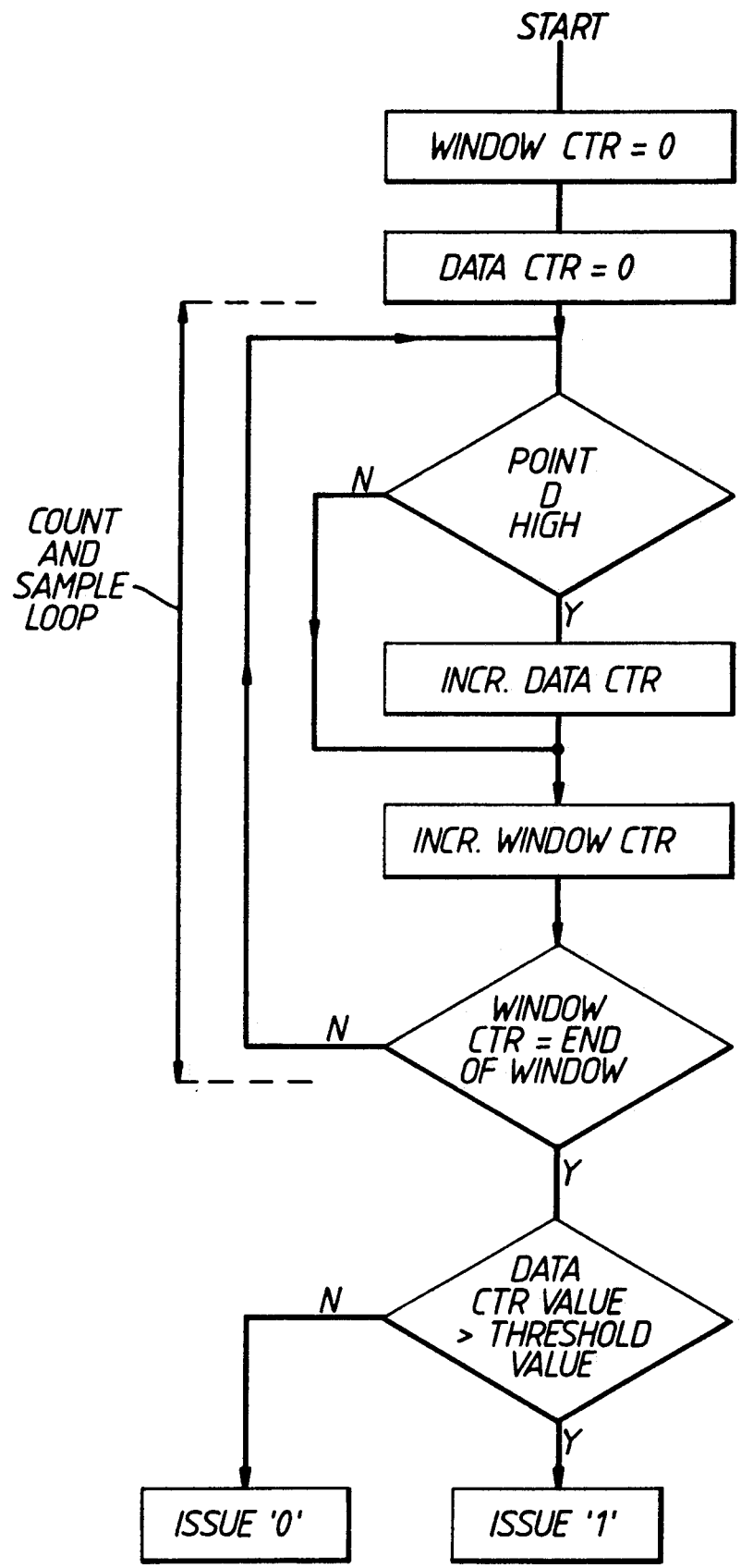
FIG. 7 shows a flow-diagram for the functioning of a microprocessor of FIG. 1.

With this amount of noise reduction, it is again easy to program the microprocessor to distinguish between the true and the noise signal, as shown for example in FIG. 7. In this example one count of the data counter is equivalent to one count of the window counter. This time is the execution time for the count and sample loop. In a practical example the sample rate may be 120 $\mu$sec (6 samples in a 600 $\mu$sec window) and a '1' may be issued if the data counter is 3 or greater, otherwise a '0' is issued.

Once the signal (true or noise) falls to a critical value, 35mV at 120 Khz, then the output from the demodulator begins to fall linearly with it, until below 20mV (at 120 Khz) no signal is output from the demodulator. This critical value becomes higher for lower frequencies until no output at all is possible below the cutoff frequency. In this way, low amplitude signals below the level of interest are rejected.

The circuit designated by 4 is able to detect the power mains crossing through or near zero and to discriminate between noise and digital signal. It is made up of three diodes D5-7 and resistors R8 and R9 coupled to a microprocessor. A window near or at the zero-crossing can thus be selected and the microprocessor can discriminate between noise and the true signal. The value of the megaohm resistor can be altered to make the voltage at the input port halfway between logic '1' and logic '0' when the mains input is OV.

I claim:

1. A slave receiver for detecting commands in the form of digital signals modulated on a cyclic carrier, the receiver comprising:
   (a) an input for said carrier;
   (b) capacitive means;
   (c) first charging means coupling the input to said capacitive means for causing cycles of the carrier to charge the capacitive means beyond a predetermined level of charge when the carrier cycles exist above a given frequency and for at least a first given time;
   (d) second charging means for applying charge to the capacitive means in the opposite direction so that, when the predetermined level of charge has been exceeded and there is a subsequent gap in the carrier cycles of a second given time, the charge falls below said predetermined level, and when carrier cycles are subsequently restored said predetermined level of charge is reached after a time directly related to the length of such gap;
   (e) switching means coupled to the capacitive means to produce a binary signal corresponding to the existence of said predetermined level of charge;
   (f) means for defining time windows; and
   (g) means coupled to the switching means for processing said binary signal within said time windows to determine therefrom digital values dependent upon states of the binary signal within said windows.

2. A slave receiver as claimed in claim 1, wherein the output stage of the switching means is such that its output level is directly related to the peak-to-peak level of the carrier up to a given limit.

3. A slave receiver as claimed in claim 1 for coupling to an alternating voltage power main, having points at which the alternating voltage passes through zero, to receive digital signals therefrom conveyed by a carrier modulated on the power main, wherein said windows are synchronised with the said points of the power main.

4. A slave receiver as claimed in claims 1, wherein the processing means is operable to discriminate between noise and digital values in that it comprises means for determining the length of time for which the second state exists in the said windows.

5. A slave receiver for detecting commands in the form of digital signals modulated on a cyclic carrier, the receiver comprising:
   (a) an input for said carrier;
   (b) capacitive means;
   (c) first charging means coupling the input to said capacitive means for causing cycles of the carrier to charge the capacitive means beyond a predetermined level of charge when the carrier cycles exist above a given frequency and for at least a first given time;
   (d) second charging means for applying charge to the capacitive means in the opposite direction so that, when the predetermined level of charge has been exceeded and there is a subsequent gap in the carrier cycles of a second given time, the charge falls below said predetermined level, and when carrier cycles are subsequently restored said predetermined level of charge is reached after a time directly related to the length of such gap;
   (e) switching means coupled to the capacitive means to produce a binary signal corresponding to the existence of said predetermined level of charge;

(f) means for defining time windows; and (g) means coupled to the switching means for processing said binary signal within said time windows to determine therefrom digital values dependent upon states of the binary signal within said windows, wherein said input for said carrier comprises:

(i) an input to receive said signal;

(ii) a current flow path comprising a sequential arrangement of two diodes with the same conducting direction; and (iii) a first capacitance coupling the input to the junction between said diodes, said capacitive means comprising a second capacitance connected across diodes, and the output stage comprising switching means having a control input connected across the second capacitance, so that the state of the switching means is dependent upon the charge of the second capacitance.

6. A slave receiver as claimed in claim 5 wherein resistance is included in said sequential arrangement.

7. A slave receiver as claimed in claim 5, and comprising a pre-amplifier coupling said input to said first capacitance.

8. A slave receiver as claimed in claim 5, and comprising power supply points for the circuit and wherein the switching means, the sequential arrangement and said pre-amplifier are connected between said power supply points.

9. A slave receiver as claimed in claim 5, and further comprising an input stage having an input filter for coupling to the mains to receive therefrom a carrier signal modulated on the mains and a limiter for limiting the peak-to-peak value of the carrier signal as delivered to the input stage.

10. A slave receiver for coupling to a main power to receive digital signals therefrom conveyed by a carrier modulated on the power main, the digital values of a received signal being dependent upon the number of cycles of carrier within windows synchronised with the zero crossings of the power main, the receiver having a demodulator comprising input means for coupling to a power main to extract therefrom a carrier signal of given frequency, limiting means to limit the amplitude of the extracted signal, a capacitive arrangement arranged to be charged and discharged in dependence upon the presence and absence of cycles of the extracted signal and output means arranged to adopt one or other of two states depending upon the level of charge on the capacitive arrangement, the demodulator being such that the output means is in a first state in the absence of any extracted signal and adopts and maintains the second state in the presence of a substantially continuous extracted signal (at said given frequency) for at least a given time, adopting the first state again when gaps in the cycles of the extracted signal exist for more than a given time or when the frequency of the extracted signal is below a second frequency less than the given frequency, thereby to demodulate said carrier signal whilst discriminating against noise signals on the power main.

11. A slave receiver according to claim 10 and including computing means coupled to detect said states and programmed to discriminate between noise and the intended digital values conveyed by the carrier in said window on the basis of the length of time for which said second state exists during the windows.

* * * * *